US010394506B2

(12) United States Patent
Sawada

(10) Patent No.: US 10,394,506 B2
(45) Date of Patent: Aug. 27, 2019

(54) INFORMATION PROCESSING APPARATUS, SYSTEM, CONTROL METHOD, AND PROGRAM

(71) Applicant: CANON KABUSHIKI KAISHA, Tokyo (JP)

(72) Inventor: Hideharu Sawada, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/161,790

(22) Filed: May 23, 2016

(65) Prior Publication Data

US 2016/0350045 A1 Dec. 1, 2016

(30) Foreign Application Priority Data

May 29, 2015 (JP) ................................ 2015-110369

(51) Int. Cl.
*G06F 3/12* (2006.01)
*G06K 15/00* (2006.01)

(52) U.S. Cl.
CPC .......... *G06F 3/1288* (2013.01); *G06F 3/1222* (2013.01); *G06F 3/1238* (2013.01)

(58) Field of Classification Search
None
See application file for complete search history.

(56) References Cited

U.S. PATENT DOCUMENTS

2007/0028232 A1* 2/2007 Kim ...................... G06F 3/1222 717/174
2014/0372514 A1* 12/2014 Doui .................... G06F 3/1236 709/203

FOREIGN PATENT DOCUMENTS

JP 2006-65889 A 3/2006

* cited by examiner

*Primary Examiner* — Dov Popovici
(74) *Attorney, Agent, or Firm* — Canon U.S.A., INC. IP Division

(57) ABSTRACT

An apparatus includes an input unit configured to input account information; a setting unit configured to set whether or not input of account information by the input unit is restricted; a hold controller configured to hold information regarding restriction in a first holding memory; a transmission unit configured to transmit data to an external apparatus; and an adding unit configured to add the account information to the transmitted data. The hold controller holds the account information in a second holding memory which is accessed by an administrator and which is not accessed by a user or in a third holding memory which is accessed by the user, based on operation authority. The adding unit adds the account information held in the second holding memory or in the third holding memory, based on the operation authority and the information regarding restriction held in the first holding memory.

15 Claims, 9 Drawing Sheets

INFORMATION PROCESSING APPARATUS, SYSTEM, CONTROL METHOD, AND PROGRAM

BACKGROUND OF THE INVENTION

Field of the Invention

One disclosed aspect of the embodiments relates to an information processing apparatus, a system, a control method, and a program therefor.

Description of the Related Art

There have been print systems which collect user names and department names at the time of printing in order to perform accounting management of a printer. With such a print system, a user registers, as account information of the user, a user ID and the ID of a department to which the user belongs into a printer driver. The registered account information is transmitted, along with a print job, from the printer driver to the printer at the time of printing. The printer analyzes the received print job, and performs accounting management by storing the account information included in the print data into a predetermined location. With the print system described above, the user is able to change the account information, and the user is not forced to use account information set by the administrator.

In an office environment, such as an environment in which a printer is shared by a plurality of users, accounting management is performed at the time of printing as described above. In such an environment, a printer driver installed in a print server is often shared by client computers as hosts (hereinafter, may also be referred to as shared printer connection).

For such shared printer connection, a method has been known in which, in the case where a user is forced to use account information set by an administrator, the account information is registered as a default value of a printer driver installed in a print server. In this method, when the printer driver is installed into a client computer, the account information set by the administrator is set as the default value. Furthermore, for shared printer connection, a method has been suggested for performing accounting management by using an accounting application for a server on the print server (see Japanese Patent Laid-Open No. 2006-65889).

However, in the method for registering accounting information as a default value of a printer driver installed in a print server, the account information cannot be changed. That is, although the account information which is set by the administrator can be registered at the time when the user first installs a printer driver into a client computer, the user cannot set account information in a desired manner.

Furthermore, in the method described in Japanese Patent Laid-Open No. 2006-65889, a client computer holds a piece of account information and transmits the account information to an accounting application for a server. Therefore, the user is not forced to use the account information set by the administrator.

SUMMARY OF THE INVENTION

An information processing apparatus includes an input unit, a setting unit, a hold controller, a transmission unit, and an adding unit. The input unit is configured to input account information. The setting unit is configured to set whether or not input of account information by the input unit is restricted. The hold controller is configured to hold information regarding restriction set by the setting unit in a first holding memory. The transmission unit is configured to transmit data to an external apparatus. The adding unit is configured to add the account information to the data to be transmitted by the transmission unit. The hold controller holds the account information input by the input unit in a second holding memory which is accessed by an administrator and which is not accessed by a user or in a third holding memory which is accessed by the user, based on operation authority. The adding unit adds the account information held in the second holding memory to the data or the account information held in the third holding memory to the data, based on the operation authority and the information regarding restriction held in the first holding memory.

Further features of the disclosure will become apparent from the following description of exemplary embodiments with reference to the attached drawings.

DESCRIPTION OF THE EMBODIMENTS

Hereinafter, embodiments of the disclosure will be described in detail with reference to the drawings. The embodiments described below are not intended to limit the claims of the disclosure.

First Embodiment

Figure 1:
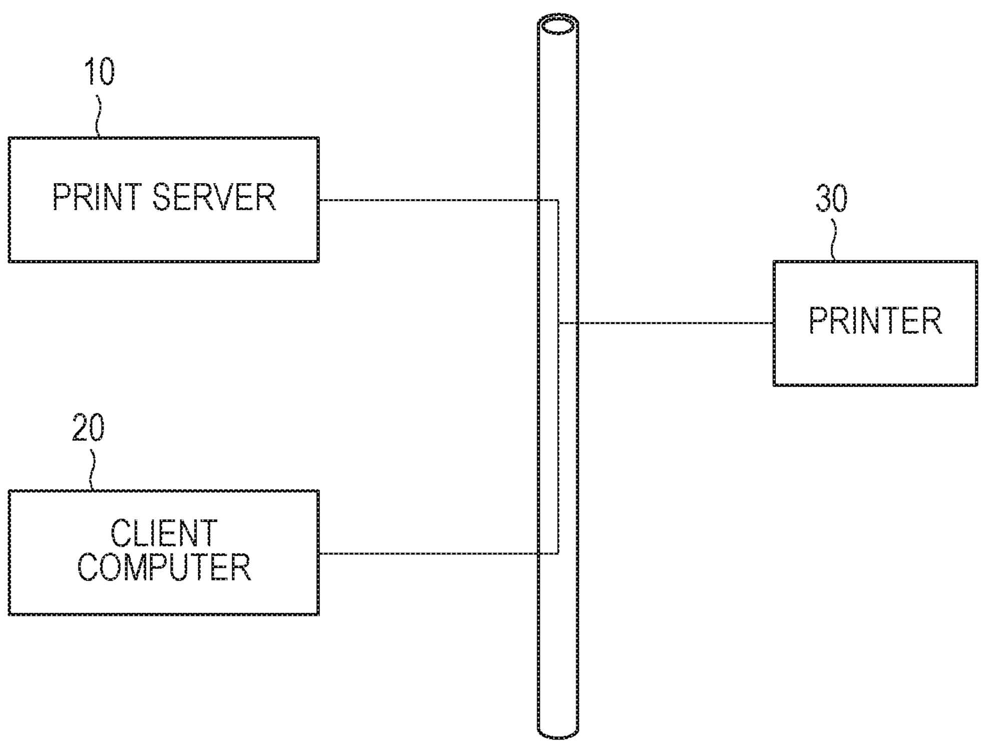
FIG. 1 is a block diagram illustrating a hardware configuration of a print system according to a first embodiment.

FIG. 1 is a diagram for explaining a configuration of a print server system according to a first embodiment. As illustrated in FIG. 1, the print server system includes a print server 10, a client computer 20, and a printer 30. The print server 10, the client computer 20, and the printer 30 are connected to one another via an interface such as a universal serial bus (USB) or a network such as Ethernet®.

The print server 10 functions as a host computer. In the print server system, by instructing the printer 30 to perform printing, the print server 10 is able to cause the printer 30 to perform printing. Furthermore, by receiving print data from the client computer 20 and transmitting the received print data to the printer 30, the print server 10 is able to cause the printer 30 to perform printing.

The print server system according to this embodiment is a shared server system in which a plurality of users are able to use the client computer 20.

A hardware configuration of the print server 10 and the printer 30 will be described below with reference to FIG. 2.

Figure 2:
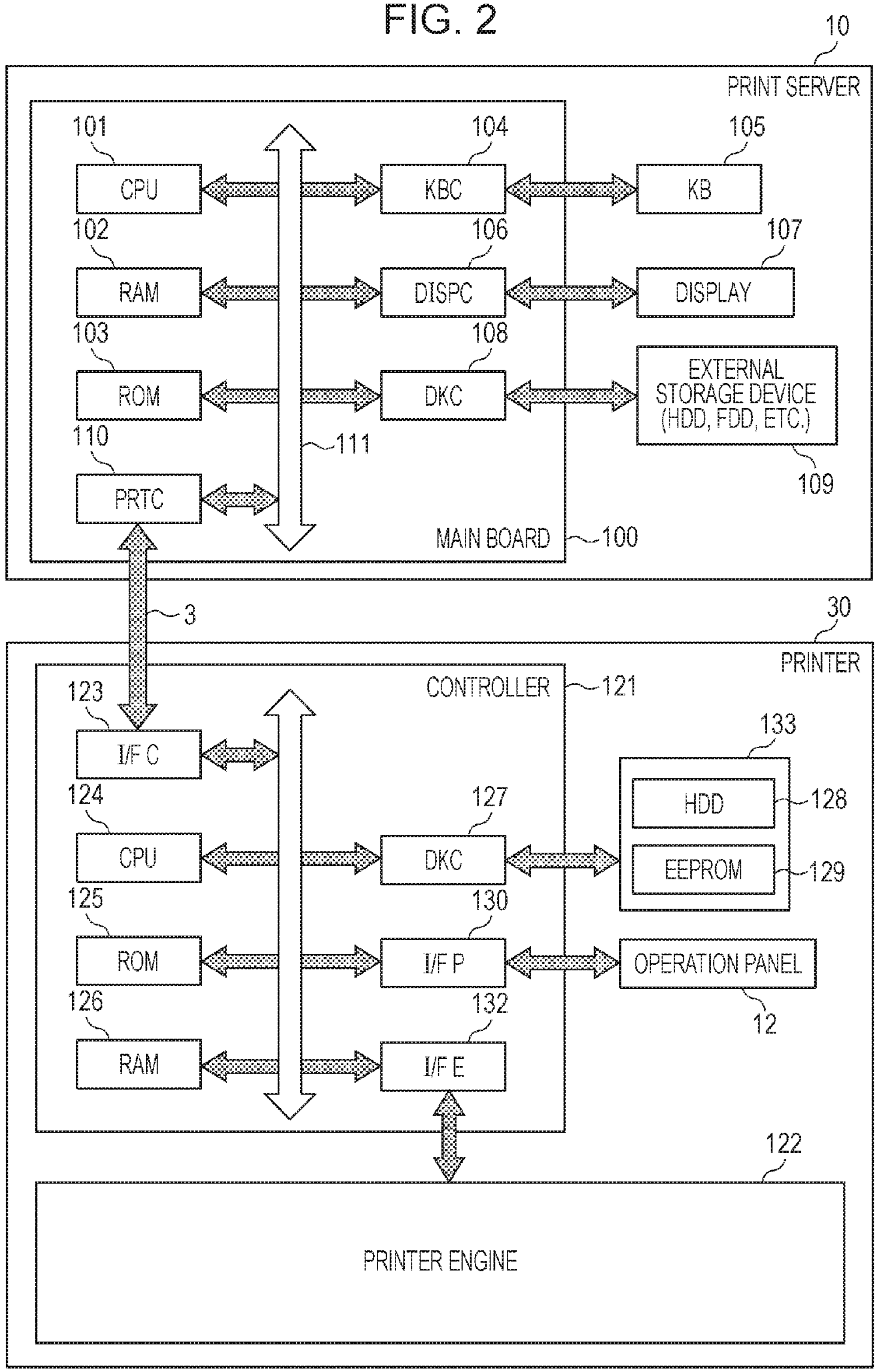
FIG. 2 is a diagram illustrating a configuration of a shared printer system according to the first embodiment.

As illustrated in FIG. 2, the print server 10 and the printer 30 are connected to each other via a predetermined bi-directional interface 3 (for example, a USB, IEEE1394, transmission control protocol/internet protocol (TCP/IP), or the like).

The print server 10 is an information processing apparatus such as, for example, a personal computer (PC). The print server 10 includes a main board 100, a keyboard (KB) 105, a display (DISPLAY) 107, and an external storage device 109.

The main board 100 includes a central processing unit (CPU) 101, a random access memory (RAM) 102, a read only memory (ROM) 103, a keyboard controller (KBC) 104, a display controller (DISPC) 106, a disk controller (DKC) 108, and a printer controller (PRTC) 110. In the main board 100, the above components are connected to one another via a system bus 111.

The CPU 101 performs comprehensive control of the above components connected to the system bus 111, and executes various programs stored in the ROM 103 and the like. The RAM 102 functions as a main memory or a work area for the CPU 101. The ROM 103 stores an operating system, a program for executing each function described in this embodiment, a boot program, various applications, a printer control command generation program (hereinafter, a printer driver), and the like.

The KBC 104 controls input from the KB 105, a pointing device, which is not illustrated in FIG. 2, and the like. The KBC 104 may also be referred to as an operation unit or an input unit.

The DISPC 106 controls display of the DISPLAY 107, which is a display unit.

The DKC 108 controls access of the main board 100 to the external storage device 109 such as a hard disk or a flexible disk (FDD). The PRTC 110 is connected to the printer 30 via the bi-directional interface 3 and controls communication processing of the printer 30 with data and commands.

In this embodiment, the hardware configuration of the client computer 20 is similar to that of the print server 10, and therefore explanation for the hardware configuration of the client computer 20 will be omitted.

The printer 30 includes a controller 121, a printer engine 122, an operation panel 12, and a nonvolatile storage device 133, and is connected to the print server 10 via the bi-directional interface 3.

The operation panel 12 includes an operation unit and a display unit, and is, for example, a touch panel.

The nonvolatile storage device 133 includes a hard disk (HDD) 128 and an electrically erasable programmable read-only memory (EEPROM) 129. The nonvolatile storage device 133 may also be referred to as a nonvolatile memory. In this embodiment, the nonvolatile storage device 133 includes the HDD 128 and the EEPROM 129. However, the nonvolatile storage device 133 is not limited to this. For example, the nonvolatile storage device 133 may include only one of the HDD 128 and the EEPROM 129. The HDD 128 stores a large volume of data including data from the print server 10 and attached information regarding the data. The EEPROM 129 stores information unique to a printer used at the time of printing. The controller 121 includes a CPU 124, a ROM 125, a RAM 126, an interface controller (I/F C) 123, a disk controller (DKC) 127, a panel interface (I/F P) 130, and an engine interface (I/F E) 132. In the controller 121, the above components are connected to one another via a system bus.

The CPU 124 performs comprehensive control of the above components connected to the system bus, and executes various programs stored in the ROM 125 and the like. The ROM 125 stores a program for achieving optimal recording by receiving printing image data and command data from the print server 10 and controlling the printer engine 122, and various data. The RAM 126 is used as a work area which temporarily stores various data and various programs.

The I/F C 123 is connected to the print server 10 via the bi-directional interface 3, and controls processing for communication with the print server 10.

The DKC 127 controls access to the nonvolatile storage device 133. The I/F P 130 controls display control of the operation panel 12 and controls input from the operation panel 12. The I/F E 132 controls the printer engine 122.

The printer engine 122 implements printing of an image on paper, which is a recording medium, based on image data in various printing methods including an inkjet method and an electrophotographic method.

At least one program provided with a printing function is incorporated in the print server 10. In addition, a printer driver which mediates printing from an application to the printer 30 is also incorporated in the print server 10.

In this embodiment, the same printer driver as that installed in the print server 10 is installed in the client computer 20. Therefore, print data generated by an application of the client computer 20 may be input to the printer 30 via the printer driver on the print server 10. That is, a user who uses the client computer 20 is able to perform printing using the printer 30. The same printer drivers do not need to be installed on the print server 10 and the client computer 20 in the case where, for example, the different printer drivers are compatible to each other or setting for causing the print server 10 to perform a larger amount of processing is made.

Figure 3:
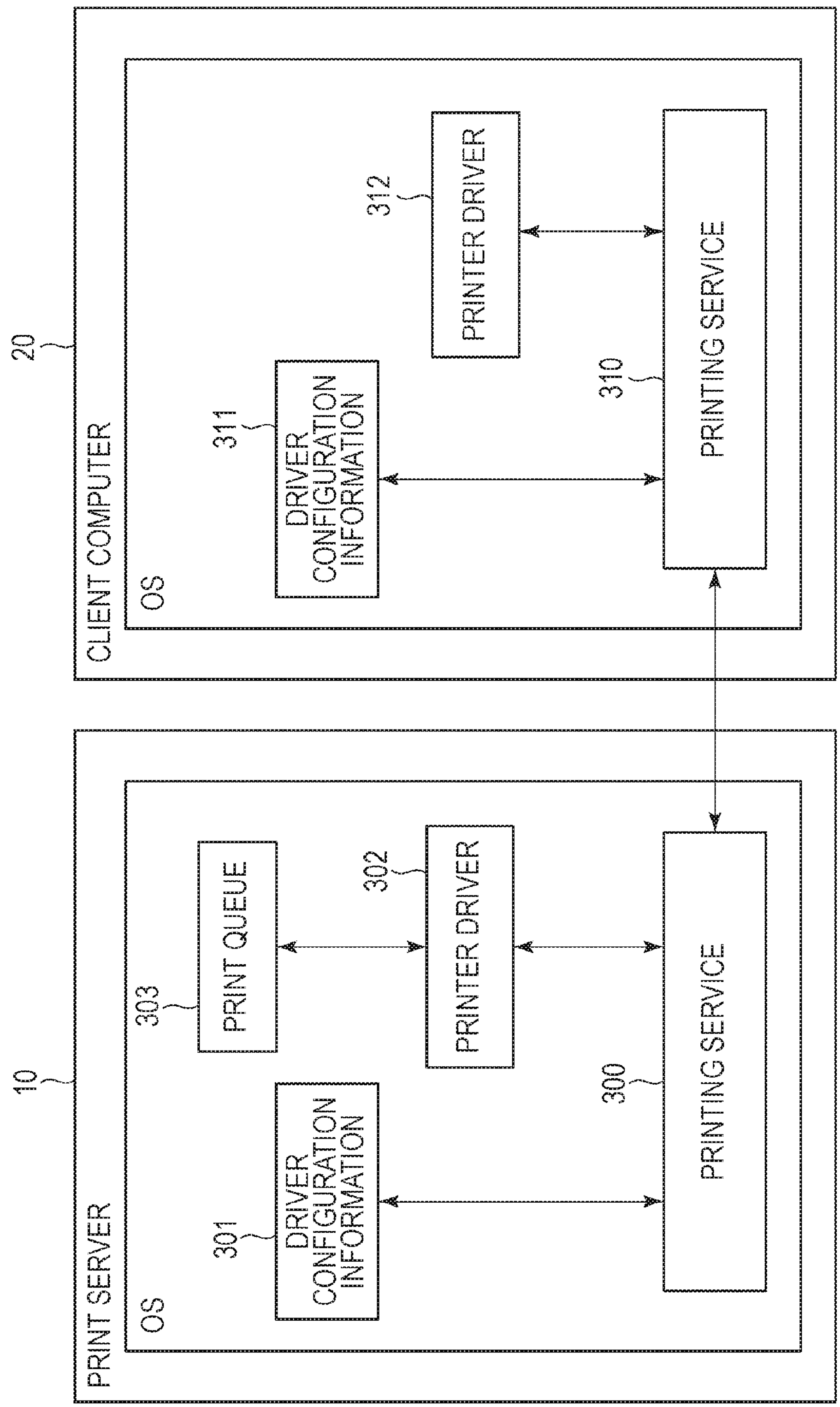
FIG. 3 is a functional block diagram for explaining a functional configuration of a print server and a client computer in the shared printer system.

A software configuration of a print server and a client computer in a printer system will be described with reference to FIG. 3. FIG. 3 is a functional block diagram for explaining modules related to install of a printer driver among functions of a print server and a client computer.

The print server 10 includes, within the OS, a service program (printing service 300), driver configuration information 301, a printer driver 302, and a print queue 303. The printing service 300 of the print server 10 is a service program for controlling print processing and install processing on the OS of the print server 10. In the case of Microsoft's Windows®, a spooler service corresponds to the printing service 300. The printing service provides an application program interface (API) for using various functions including transmission of print data from the printer driver to the printer and install of the printer driver. The program and the printer driver execute processing using the API. The driver configuration information 301 is information regarding the printer driver 302 in the print server 10, and is stored in a shared storage region of the OS. The print queue 303 is a virtual queue which temporarily stores print data to be output to the printer 30. The print data stored in the print queue 303 is transmitted to the printer 30.

The client computer 20 includes, within the OS, driver configuration information 311, a printer driver 312, and a service program (printing service 310). The printing service 310 of the client computer 20 is a service program which controls print processing and processing for installing the printer driver on the OS of the client computer 20, and has functions similar to those of the printing service 300 of the print server 10.

Before install is executed, the printer driver 312 and the driver configuration information 311 do not exist in the client computer 20. That is, the client computer 20 installs the printer driver 312 and the driver configuration information 311 from the print server 10. Thus, the client computer 20 includes, within the OS, the printer driver 312 and the driver configuration information 311, and is able to perform printing with the printer 30 via the print server 10. In this embodiment, one client computer 20 is provided. However, the disclosure is not limited to this. Two or more client computers 20 may be provided.

Figure 4:
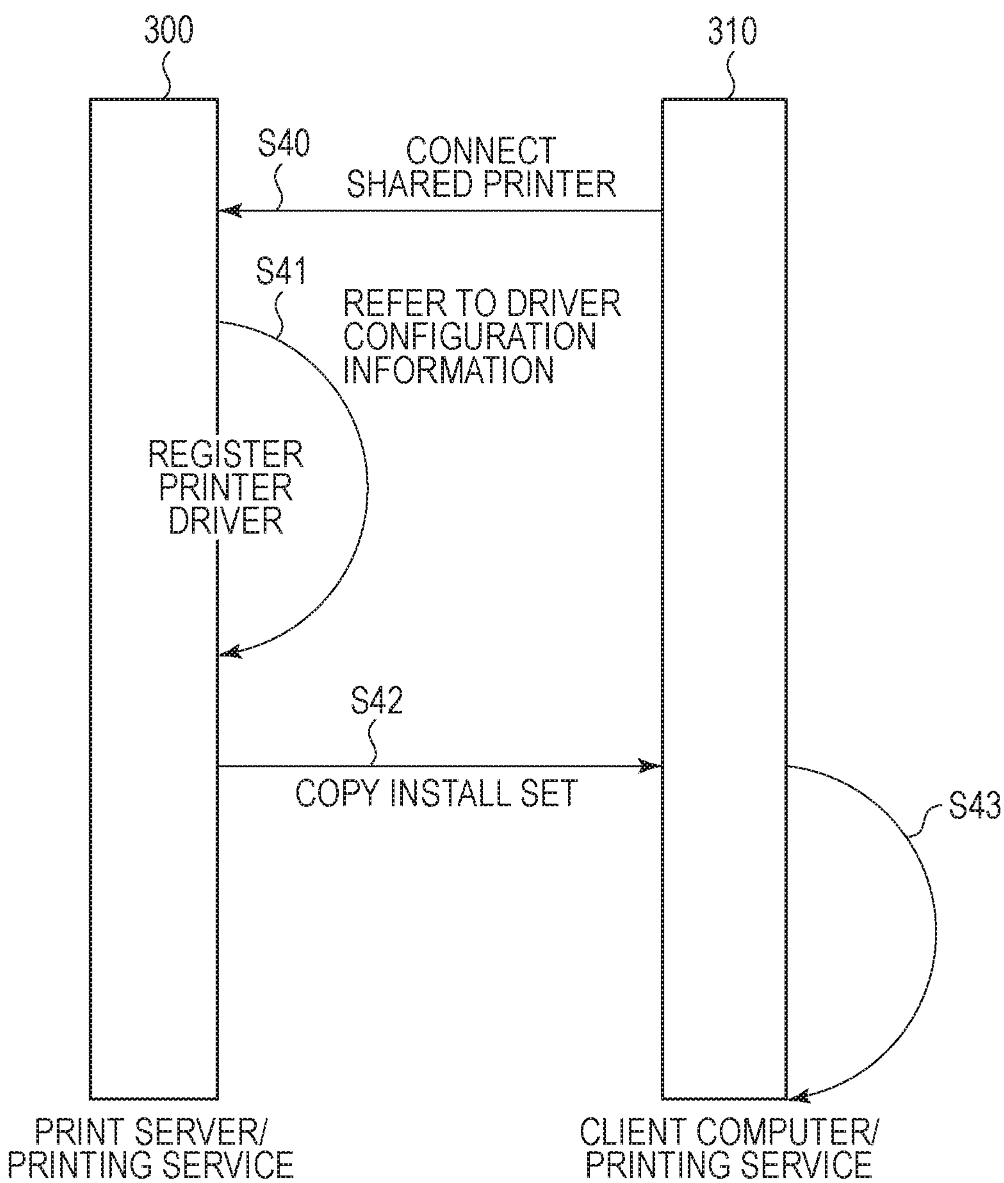
FIG. 4 is a diagram for explaining the flow of an install process of a printer driver in the shared printer system.

FIG. 4 is a diagram for explaining the flow of install in a printer system.

First, a user who uses the client computer 20 connects the client computer 20 to the shared printer 30 using the printing service 310 of the client computer 20, and outputs to the printing service 300 of the print server 10 an install request (S40). In response to the request, the printing service 300 of the print server 10 refers to the driver configuration information 301, and determines (registers) an install set to be downloaded (S41). Next, in cooperation with the printing service 310 of the client computer 20, the printing service 300 copies (transmits) the install set of the printer driver 302 stored in the print server 10 to the client computer 20 (S42). Next, the printing service 310 of the client computer 20 registers the printer driver 312 to the operating system of the client computer 20, based on the received install set, and at the same time, registers the driver configuration information 311 (S43). Thus, the user of the client computer 20 is able to cause the printer 30 to perform printing via the print server 10.

In the case where a printer driver which is appropriate for printing with the printer 30 is present in the client computer 20 before the printer driver 302 is installed, the existing printer driver may be used. Therefore, a printer driver may not be copied from the print server 10. Furthermore, in the case where an appropriate printer driver is copied through the Internet with an OS function of the client computer 20, a printer driver may not be copied from the print server 10.

Figure 5:
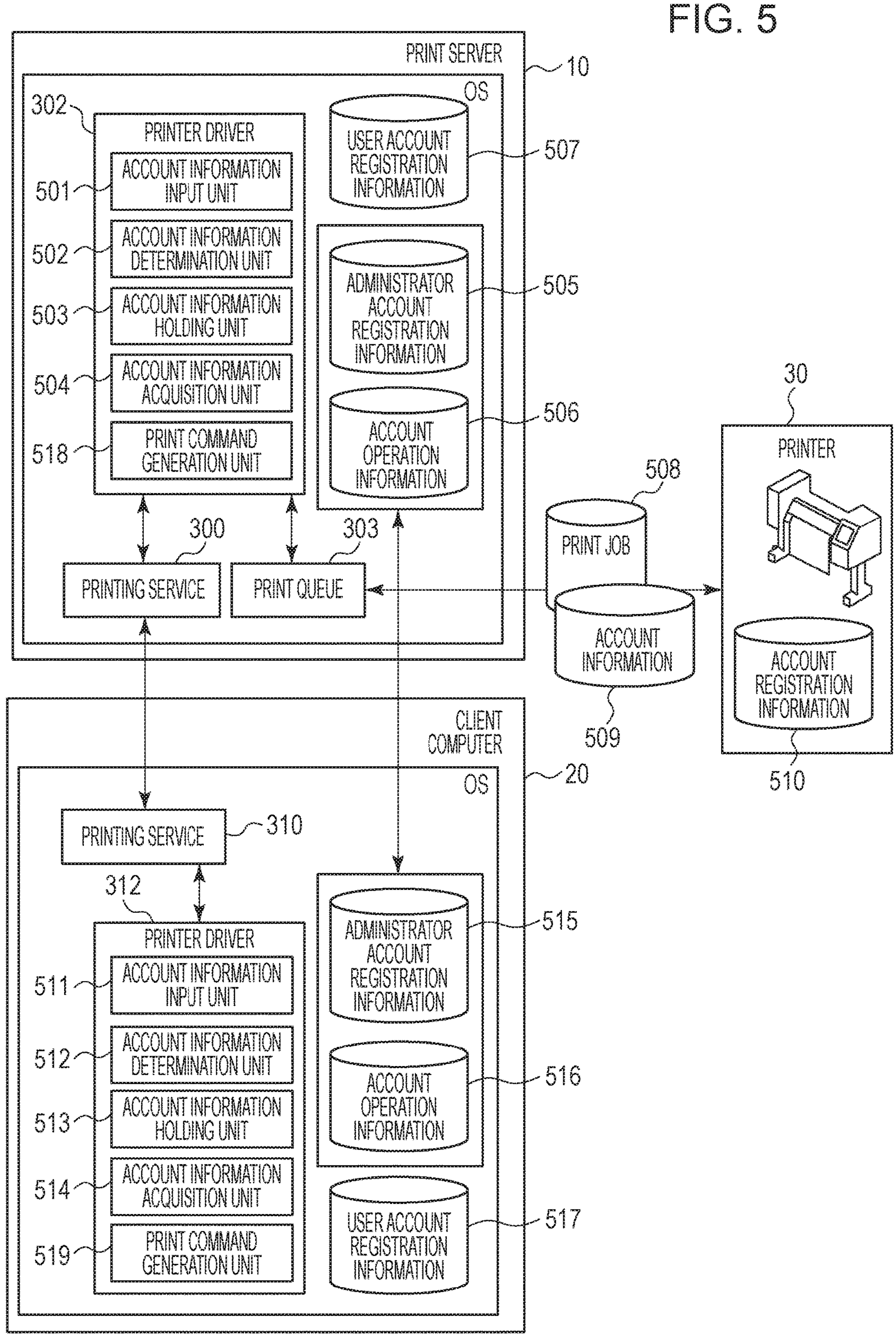
FIG. 5 is a block diagram according to the first embodiment.

FIG. 5 is a functional block diagram illustrating a functional configuration of a print server system according to this embodiment. The same parts as those in FIG. 3 will be referred to with the same reference signs.

As illustrated in FIG. 5, the print server 10 includes the printer driver 302, the printing service 300, and the print queue 303. The print server 10 also includes a registry 507 for user account registration information, a registry 505 for administrator account registration information, and a registry 506 for account operation information.

The printer driver 302 includes an account information input unit 501, an account information determination unit 502, an account information holding unit 503, an account information acquisition unit 504, and a print command generation unit 518.

Figure 6:
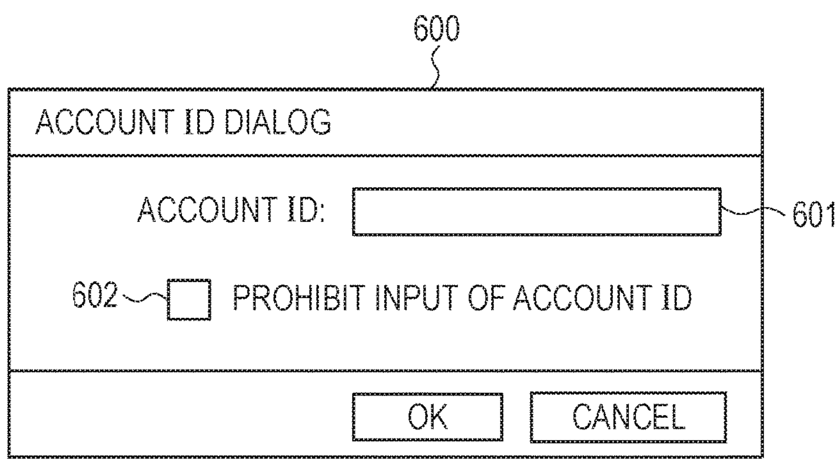
FIG. 6 is a diagram illustrating an input dialog for an account ID according to the first embodiment.

The account information input unit 501 provides an input screen for inputting account information illustrated in FIG. 6. The detailed operation of the account information input unit 501 will be described later with reference to FIG. 6. Furthermore, the account information determination unit 502 will be described later with reference to a flowchart illustrated in FIG. 8.

The account information holding unit 503 has a function of causing predetermined registries to hold administrator account registration information, account operation information, and user account registration information, based on a determination result by the account information determination unit 502. The administrator account registration information and the account operation information are held in the registry 505 for administrator account registration information and the registry 506 for account operation information, respectively, which may be transmitted to the client computer 20 by an OS function. Furthermore, the registry 505 for administrator account registration information exists in a region which may be accessed by administrator authority but may not be accessed by user authority. In contrast, the registry 507 for user account registration information in which user account registration information may be stored exists in a region which may be accessed by user authority.

The account information acquisition unit 504 has a function of acquiring account information from any of the registry 505 for administrator account registration information and the registry 507 for user account registration information, based on a determination result by the account information determination unit 502.

In the registry 506 for account operation information, setting for operating account information, more specifically, setting regarding whether or not input of an account ID should be prohibited, is set. For example, in the case where flag=1 is set in the registry 506 for account operation information, input of an account ID is prohibited. In this state, user authority is restricted (in this embodiment, invalid), and an ID which is set by an administrator is used. In the case where flag=0 is set, input of an account ID is not prohibited. In this case, the user is able to set an ID.

The print command generation unit 518 has a function of generating a print job 508 and adding account information 509 to the print job 508.

The client computer 20 includes the printer driver 312, the printing service 310, a registry 517 for user account registration information, a registry 515 for administrator account registration information, and a registry 516 for account operation information.

The printer driver 312 includes an account information input unit 511, an account information determination unit 512, an account information holding unit 513, an account information acquisition unit 514, and a print command generation unit 519. The account information holding unit 513 has a function of causing predetermined registries to hold administrator account registration information, account operation information, and user account registration information, based on a determination result by the account information determination unit 512.

The registry 515 for administrator account registration information and the registry 516 for account operation information hold the administrator account registration information and the account operation information, respectively, which are transmitted (acquired) from the print server 10. Furthermore, the registry 517 for user account registration information exists in a region which may be accessed by user authority, and holds user account registration information.

The account information acquisition unit 514 has a function of acquiring account information from any of the registry 515 for administrator account registration information and the registry 517 for user account registration information, based on a determination result by the account information determination unit 512. The print command generation unit 519 has a function similar to that of the print command generation unit 518.

The case where the client computer 20 generates a print job and printing is performed will be described below. First, when the client computer 20 issues an instruction to perform printing, the print command generation unit 519 of the printer driver 312 generates the print job 508, and the account information 509 which is selected and added by the printer driver 312 is added to the print job 508. The generated print job 508 is transmitted to the printing service 300 of the print server 10 through the printing service 310. The print job 508 received at the printing service 300 is stored into the print queue 303 via the printer driver 302 and is transmitted to the printer 30. When receiving the print job 508, the printer 30 performs print processing for the print job 508, and stores the account information 509, which has been added to the print job 508, into a registry 510 for account registration information within the printer 30.

In this embodiment, the administrator account registration information and the account operation information of the print server 10 and the administrator account registration information and the account operation information of the client computer 20 are held in registries of the individual OSs. However, the disclosure is not limited to this. The above information may be transmitted from the print server 10 to the client computer 20, and held at any location which may be referred to or set by a printer driver by administrator authority. Furthermore, in this embodiment, the user account registration information of the print server 10 and the user account registration information of the client computer 20 are held in registries of the individual OSs. However, the above information may be held at any location which may be referred to or set by a printer driver by user authority.

In the case where administrator authority is set at the print server 10, setting for the administrator authority is also transmitted to the client computer 20.

FIG. 6 is an input dialog screen 600 for an account ID which is displayed on a display unit (for example, the DISPLAY 107 or the operation panel 12) by the printer driver 302 or the printer driver 312. The screen 600 is displayed when a driver UI is activated and an accounting button displayed on the activated driver UI is selected. Account information and account operation information may be registered using the screen 600. The administrator and the user are able to input account information to an account ID input part 601 (may also be referred to as an account ID edit box). Furthermore, by ticking a tick box 602 for prohibiting change of an account ID, account operation information may be changed. In accordance with setting for change prohibition, that is, in accordance with whether or not a tick box is ticked, setting for permission or prohibition of ID change is performed. In other words, in accordance with the tick state of the tick box, switching may be made between an ID change prohibition mode and an ID change permission mode. In this embodiment, a location at which account information input to the account ID input part 601 is to be stored and initial setting display vary according to the tick state of the tick box 602. Information of whether or not the tick box 602 has been ticked is used to determine which one of administrator account information and user account information should be used when an ID is added (embedded) into a print job.

When an OK button on the input dialog screen 600 illustrated in FIG. 6 is pressed (selected), information input to the input dialog screen 600 is stored. In accordance with the pressing of the OK button, setting for operating the account information is stored in the registry 506 for account operation information, based on the setting of the tick box 602. When a cancel button is pressed, the input dialog screen 600 is closed without information input to the input dialog screen 600 being stored.

Figure 7:
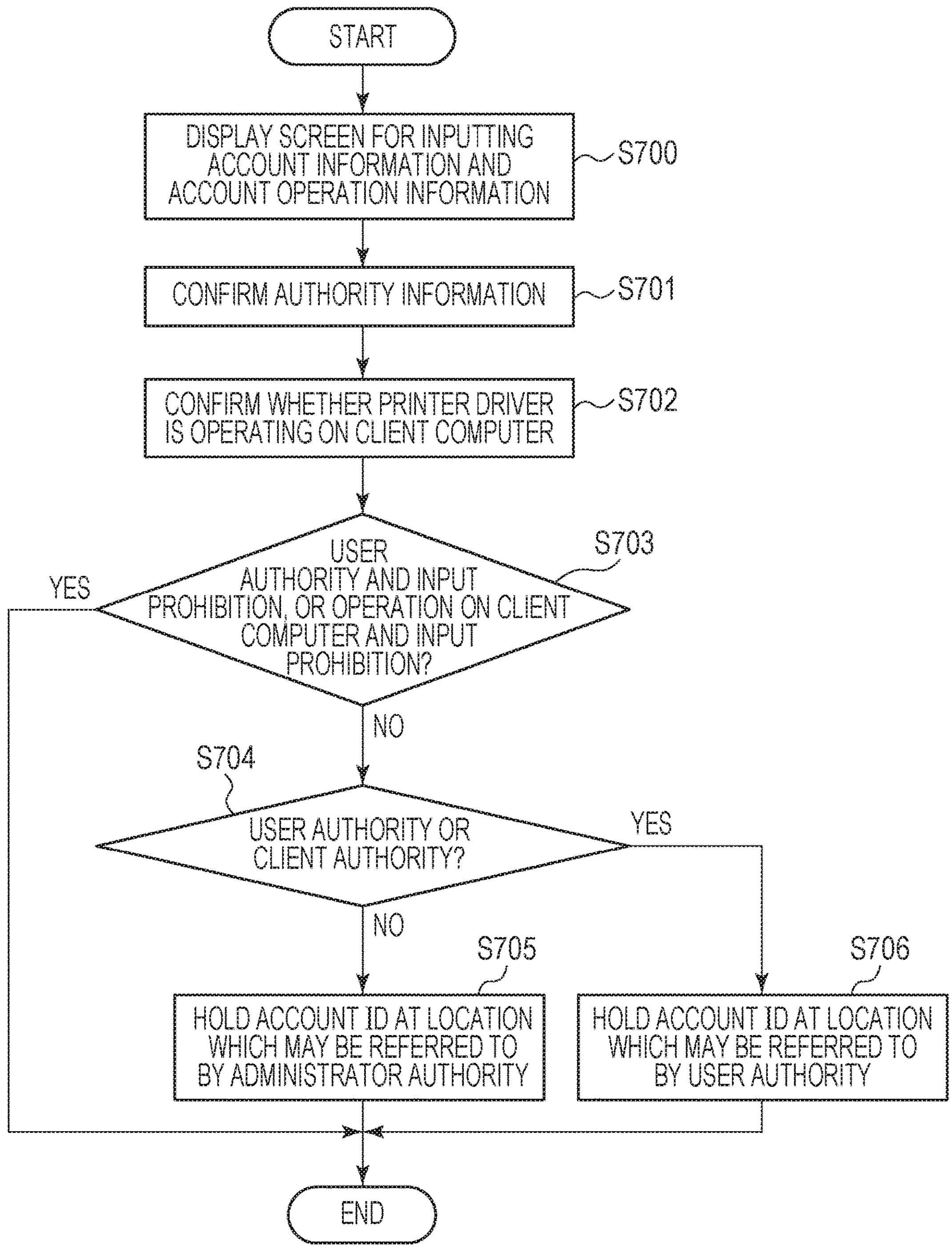
FIG. 7 is a flowchart illustrating the flow of a process for storing account information and account operation information according to the first embodiment.

FIG. 7 is a flowchart illustrating a process for determining a location at which account information is held, the process being performed by an account information determination unit of a printer driver. In the case where the process illustrated in the flowchart of FIG. 7 is performed at the printer driver 302, the process is implemented when the CPU 101 loads a control program stored in the ROM 103 to the RAM 102 and executes the control program. In the case where the process is performed at the printer driver 312, the process is implemented when the CPU 124 loads a control program stored in the ROM 125 to the RAM 126 and executes the control program. First, a driver UI is activated. When an accounting button displayed on the activated driver UI is selected, a screen for allowing a user to input an account ID and to set account operation information is provided (S700). For example, the input dialog screen 600 for an account ID illustrated in FIG. 6 is displayed on a display unit.

The printer driver confirms (acquires) information of authority (operation authority) on which the printer driver is based, by using the API of the OS (S701). In this processing, information of whether authority is administrator authority with high level of authority in which there is no restriction on the operation of the printer driver or user authority with low level of authority in which there is restriction on the operation of the driver, is acquired.

The printer driver confirms (acquires) information of an operation environment in which the printer driver is operating (S702). In this processing, information of whether the printer driver is operating on the print server 10 or on the client computer 20 is acquired using the API of the OS.

Next, based on the information of the operation authority of the printer driver acquired in S701 and the information of the operation environment for the printer driver acquired in S702, it is determined whether or not predetermined conditions are met (S703). Specifically, it is determined whether or not conditions that the operation authority of the printer driver is user authority and input of an account ID is prohibited in the account operation information or conditions that the printer driver is operating on the client computer and input of an account ID is prohibited in the account operation information are met. When administrator authority meets the conditions in S703 (Yes in S703), ID change is prohibited in the account operation information, and therefore the process ends.

When the conditions in S703 are not met (No in S703), it is determined whether or not a condition that the authority is user authority or client authority is met (S704).

When the authority is user authority or client authority (Yes in S704), an account ID to be input is determined to be held in a registry for user account registration information which may be accessed by user authority (S705). When an account ID is input and the OK button is pressed on the screen 600, a registry key for holding the user account information is created, and the input account ID is stored into the registry for user account registration information.

When the condition in S704 is not met (No in S704), an account ID to be input is determined to be held in a registry for administrator account registration information which may be accessed by administrator authority (S704). When the OK button is pressed on the screen 600, a registry key for holding the administrator account information is created, and the input account ID is stored into the registry for administrator account registration information.

In accordance with the determination, by storing the administrator account information and the user account information in different regions, the administrator account information and the user account information may be used in a switchable manner. Furthermore, by storing the user account information in a different region, the transmitted administrator account information may not be overwritten.

Figure 8:
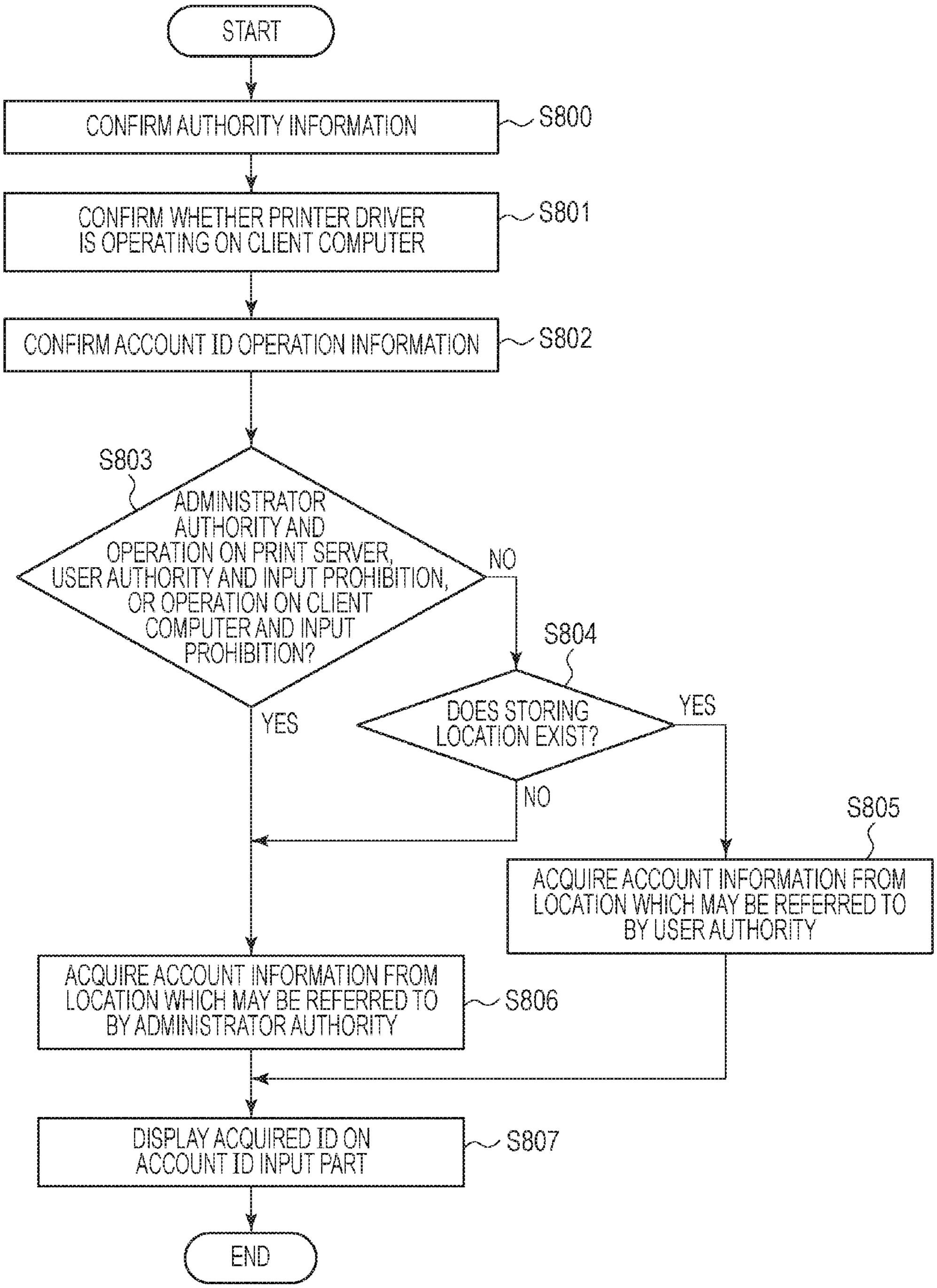
FIG. 8 is a flowchart illustrating the flow of a process for displaying account information according to the first embodiment.

FIG. 8 is a flowchart of a process for selecting, in a case where the input dialog screen 600 is activated by the user or the administrator, account information to be displayed as an initial value of the account ID input part 601. In other words, FIG. 8 is a flowchart illustrating a process for determining a location from which the account information acquisition unit of each printer driver acquires account information. In the case where the process illustrated in the flowchart illustrated of FIG. 8 is performed at the printer driver 302, the process is implemented when the CPU 101 loads a control program stored in the ROM 103 to the RAM 102 and executes the control program. In the case where the process illustrated in the flowchart is performed at the printer driver 312, the process is implemented when the CPU 124 loads a control program stored in the ROM 125 to the RAM 126 and executes the control program.

In the case where the input dialog screen 600 is activated by the user or the administrator, the printer driver confirms (acquires) information of authority (operation authority) on which the printer driver is based, by using the API of the OS (S800). In this processing, information of whether authority is administrator authority with high level of authority in which there is no restriction on the operation of the printer driver or user authority with low level of authority in which there is restriction on the operation of the driver, is acquired.

The printer driver confirms (acquires) information of an operation environment in which the printer driver is operating (S801). Specifically, in this processing (S801), information of whether the printer driver is operating on the print server 10 or on the client computer 20 is acquired using the API of the OS.

Account operation information is acquired from the registry for account operation information (S802).

Based on the information of the operation authority of the printer driver acquired in S800, the information of the operation environment for the printer driver acquired in S801, and the account operation information acquired in S802, it is determined whether or not predetermined conditions are met (S803). Specifically, it is determined whether or not conditions that the operation authority of the printer driver is administrator authority and the printer driver is operating on the print server, the conditions that the operation authority of the printer driver is user authority and input of an ID is prohibited in the account operation information, or conditions that the printer driver is operating on the client computer 20 and input of an ID is prohibited in the account operation information are met.

When the conditions in S803 are met (Yes in S803), the process proceeds to S806. When the conditions in S803 are not met (No in S803), it is determined whether or not a registry which may be accessed by user authority exists, that is, whether or not a location at which user account information is stored exists (S804). In the case where a location at which user account information is stored exists, that is, in the case where a registry key for holding user account information is created (Yes in S804), the user account information is acquired from the location which may be accessed by user authority (S805). Then, the acquired user account information is displayed in the account ID input part 601 (S807).

In the case where a location at which user account information is stored does not exist, that is, in the case where a registry key for holding user account information is not created (No in S804), the process proceeds to S806.

In S806, administrator account information is acquired from a location which may be accessed by administrator authority, and the acquired administrator account information is displayed in the account ID input part 601 (S807).

By performing the process illustrated in FIG. 8, administrator account information may be set as an initial value.

In the case where administrator account information may not be acquired in S806 or in the case where user account information may not be acquired in S805, the screen 600 is displayed without any initial value.

Figure 9:
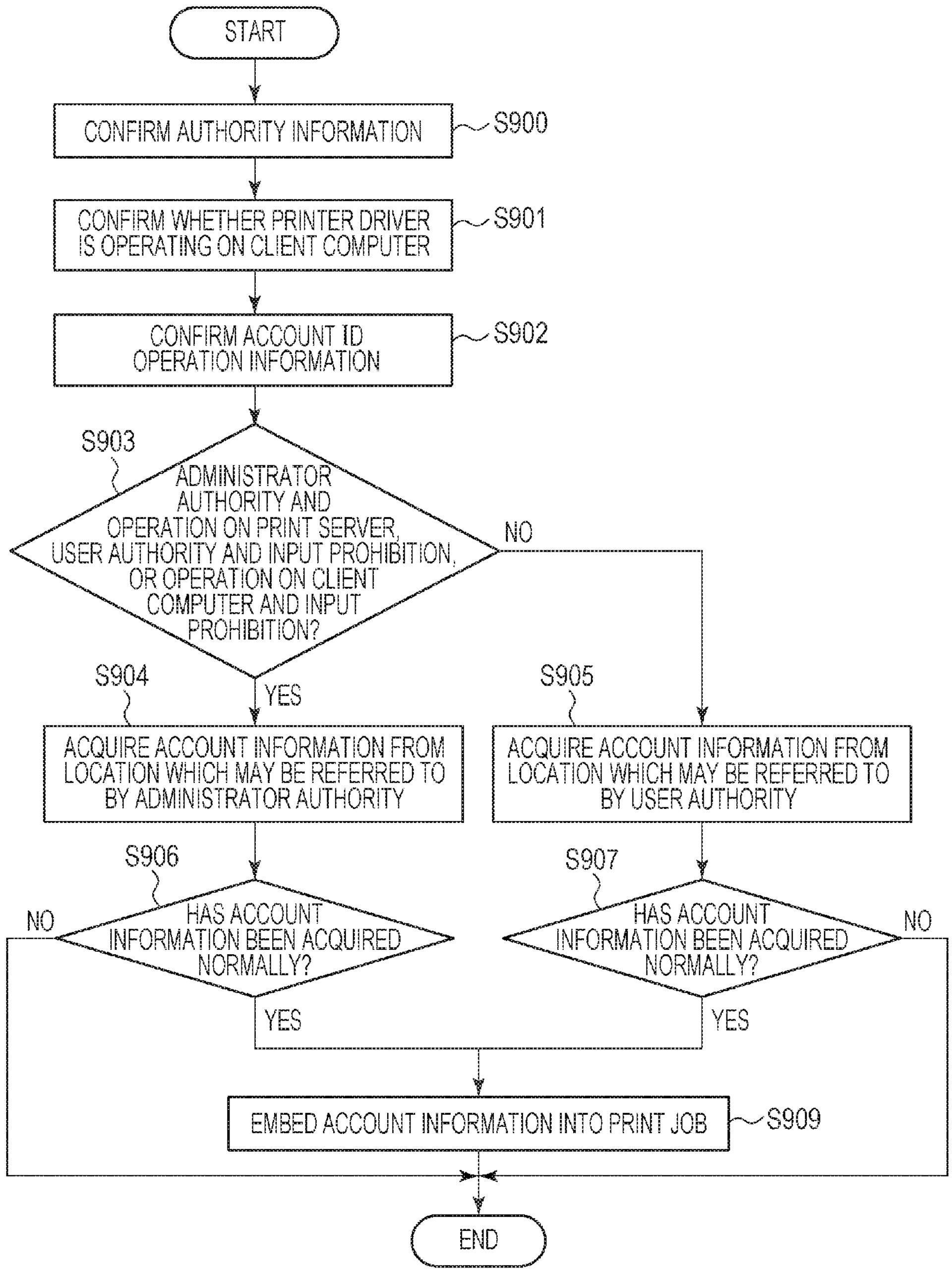
FIG. 9 is a flowchart illustrating the flow of a process for issuing account information according to the first embodiment.

FIG. 9 is a flowchart illustrating a process for issuing account information in the case where the printer 30 performs printing. More specifically, FIG. 9 is a flowchart illustrating a process for selecting any of administrator account information and user account information in the processing for issuing account information and is performed by a print command generation unit of a printer driver. In the case where the process illustrated in the flowchart of FIG. 9 is performed by the print command generation unit 518, the process is implemented when the CPU 101 loads a control program stored in the ROM 103 to the RAM 102 and executes the control program. In the case where the process is performed by the print command generation unit 519, the process is implemented when the CPU 124 loads a control program stored in the ROM 125 to the RAM 126 and executes the control program.

Processing of S900 to S902 which is performed by the print command generation unit is similar to the processing of S800 to S802 in FIG. 8, and therefore explanation for the processing of S900 to S902 will be omitted.

In S903, based on the information of the operation authority of the printer driver acquired in S900, the information of the operation environment for the printer driver acquired in S901, and the account operation information acquired in S902, it is determined whether or not predetermined conditions are met. Specifically, it is determined whether or not conditions that the operation authority of the printer driver is administrator authority and the printer driver is operating on the print server, the conditions that the operation authority of the printer driver is user authority and input of an ID is prohibited in the account operation information, or conditions that the printer driver is operating on the client computer 20 and input of an ID is prohibited in the account operation information are met.

When the conditions in S903 are met (Yes in S903), the administrator account information is acquired from a location which may be referred to by administrator authority, that is, from the registry for administrator account information (S904), and it is determined whether or not the administrator account information has been acquired normally (S906). When the administrator account information has been acquired normally (Yes in S906), the acquired account information is embedded (added) into a print job (S909).

When the conditions in S903 are not met (No in S903), the user account information is acquired from a location which may be referred to by user authority, that is, from the registry for user account information (S905), and it is determined whether or not the user account information has been acquired normally (S907). When the user account information has been acquired normally (Yes in S907), the acquired account information is embedded (added) into the print job (S909), and the process ends.

In the case where the account information has not been acquired normally (No in S906 or No in S907), the acquired account information is disposed of, and the process ends without adding the account information.

The print job obtained in the process illustrated in FIG. 9 is transmitted to the printer 30 via the printer driver 302 of the print server 10.

The processing for issuing account information which is performed at the time of printing may be performed by either the print command generation unit 518 or the print command generation unit 519. In the case where the account information has not been acquired normally, the account information is not added to the print job, and therefore no incorrect value is added to the print job. In other words, correct account information may be embedded into the print job.

As described above, in this embodiment, input is restricted based on restriction on input of account information. Furthermore, the input account information is stored in different locations depending on the authority. Based on the operation authority and restriction on the account information, the account information to be added to print data is determined.

According to this embodiment, as a setting unit that sets account information in a shared printer environment, setting may be performed in a manner switchable between the case where administrator account information is forced to be used and the case where the user is allowed to input desired account information.

The disclosure is not limited to the embodiment described above. In the foregoing embodiment, examples of an information processing apparatus include the print server 10 and the client computer 20. However, the disclosure is not limited to this. Furthermore, in the foregoing embodiment, an example of an image processing apparatus includes the printer 30. However, the disclosure is not limited to this. The image processing apparatus may be, for example, a scanner or a multifunction peripheral (hereinafter, referred to as an MFP) having a print function and a scan function.

In the foregoing embodiment, an example of print processing has been described. However, the disclosure is not limited to this. Other types of processing may be performed.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-110369, filed May 29, 2015, which is hereby incorporated by reference herein in its entirety.

What is claimed is:

1. A system comprising:

a server;

a client apparatus; and a printer, wherein the server includes one or more processors operating to:

acquire first account information input on an input screen by a user, acquire account change restriction information which indicates whether change in account information that is to be added to a print job is prohibited or not, hold the acquired account change restriction information in a first restriction information memory, and determine an operation authority on which a printer driver in the server is operating, wherein, in a case where the operation authority on which the printer driver in the server is operating is an administrator authority, the acquired first account information is held, as administrator account information, in a first administrator account registry memory which is able to be accessed by the administrator authority and which is not able to be accessed by a user authority, the user authority being lower in authority level than the administrator authority, and there being predetermined restriction on operation in the user authority, wherein, in a case where the operation authority on which the printer driver in the server is operating is the user authority, the acquired first account information is held, as user account information, in a first user account registry memory which is able to be accessed by the user authority, and wherein the client apparatus includes one or more processors operating to:

acquire, from the server, the account change restriction information held in the first restriction information memory, acquire, from the server, the first account information held in the first administrator account registry memory, acquire second account information input on an input screen by a user hold, in a second restriction information memory which is able to be accessed by the administrator authority and which is not able to be accessed by the user authority, the account change restriction information acquired from the server, hold, in a second administrator account registry memory which is able to be accessed by the administrator authority and which is not able to be accessed by the user authority, the first account information acquired from the server as administrator account information, determine whether the account change restriction information held in the second restriction information memory indicates the change in account information is prohibited, and determine an operation authority on which a printer driver in the client apparatus is operating, hold the acquired second account information as user account information, in a second user account registry memory which is able to be accessed by the user authority, in a case where the operation authority on which the printer driver in the client apparatus is operating is the user authority, and where the account change restriction information held in the second restriction information memory indicates the change in account information is prohibited, wherein, in a case where the account change restriction information held in the second restriction information memory indicates the change in account information is prohibited, the first account information held in the second administrator account registry memory is added to the print job, wherein, in a case where the account change restriction information held in the second restriction information memory does not indicate the change in account information is prohibited and where the operation authority on which the printer driver in the client apparatus is operating is the user authority, the second account information held in the second user account registry memory is added to the print job, and wherein the print job that the first account information or the second account information is added to is transmitted to the printer via the server.

2. The system according to claim 1, wherein in the case where the account change restriction information held in the second restriction information memory indicates the change in account information is prohibited, the first account information held in the second administrator account registry memory is added to the print job, even if the operation authority on which the printer driver in the client apparatus is operating is the user authority.

3. The system according to claim 1, wherein in the case where the account change restriction information held in the second restriction information memory does not indicate that the change in the account information is prohibited and where the operation authority on which the printer driver in the client apparatus is operating is the administrator authority, the first account information held in the second administrator account registry memory is added to the print job.

4. The system according to claim 1, wherein in the case where the account change restriction information held in the second restriction information memory indicates the change in account information is prohibited and where the first account information held in the second administrator account registry memory is not acquired, no account information is added to the print job.

5. The system according to claim 1, wherein in the case where the account change restriction information held in the second restriction information memory does not indicate the change in account information is prohibited, where the operation authority on which the printer driver in the client apparatus is operating is the user authority, and where the second account information held in the second administrator account registry memory is not acquired, no account information is added to the print job.

6. A control method of a system including a server, a client apparatus, and a printer, the method of the server comprising:

acquiring first account information input on an input screen by a user, acquiring account change restriction information which indicates whether change in account information that is to be added to a print job is prohibited or not, holding the acquired account change restriction information in a first restriction information memory, and determining an operation authority on which a printer driver in the server is operating, wherein, in a case where the operation authority on which the printer driver in the server is operating is an administrator authority, the acquired first account information is held, as administration account information, in a first administrator account registry memory which is able to be accessed by the administrator authority and which is not able to be accessed by a user authority, the user authority being lower in authority level than the administrator authority, and there being predetermined restriction on operation in the user authority, and wherein, in a case where the operation authority on which the printer driver in the server is operating is the user authority, the acquired first account information is held, as user account information, in a first user account registry memory which is able to be accessed by the user authority, and the method of the client apparatus comprising:

acquiring, from the server, the account change restriction information held in the first restriction information memory, acquiring, from the server, the first account information held in the first administrator account registry memory, acquiring second account information input on an input screen by a user, holding, in a second restriction information memory which is able to be accessed by the administrator authority and which is not able to be accessed by the user authority, the account change restriction information acquired from the server, holding, in a second administrator account registry memory which is able to be accessed by the administrator authority and which is not able to be accessed by the user authority, the first account information acquired from the server as administrator account information, determining whether the account change restriction information held in the second restriction information memory indicates the change in account information is prohibited, and determining an operation authority on which a printer driver in the client apparatus is operating, holding the acquired second account information as user account information, in a second user account registry memory which is able to be accessed by the user authority, in a case where the operation authority on which the printer driver in the client apparatus is operating is the user authority, and where the account change restriction information held in the second restriction information memory indicates the change in account information is prohibited, wherein, in a case where the account change restriction information held in the second restriction information memory indicates the change in account information is prohibited, the first account information held in the second administrator account registry memory is added to the print job, wherein, in a case where the account change restriction information held in the second restriction information memory does not indicate the change in account information is prohibited and where the operation authority on which the printer driver in the client apparatus is operating is the user authority, the second account information held in the second user account registry memory is added to the print job, wherein the print job that the first account information or the second account information is added to is transmitted to the printer via the server.

7. The method according to claim 6, wherein in the case where the account change restriction information held in the second restriction information memory indicates the change in account information is prohibited, the first account information held in the second administrator account registry memory is added to the print job, even if the operation authority on which the printer driver in the client apparatus is operating is the user authority.

8. The method according to claim 6, wherein in the case where the account change restriction information held in the second restriction information memory does not indicate that the change in the account information is prohibited and where the operation authority on which the printer driver in the client apparatus is operating is the administrator authority, the first account information held in the second administrator account registry memory is added to the print job.

9. The method according to claim 6, wherein in the case where the account change restriction information held in the second restriction information memory indicates the change in account information is prohibited and where the first account information held in the second administrator account registry memory is not acquired, no account information is added to the print job.

10. The method according to claim 6, wherein in the case where the account change restriction information held in the second restriction information memory does not indicate the change in account information is prohibited, where the operation authority on which the printer driver in the client apparatus is operating is the user authority, and where the second account information held in the second administrator account registry memory is not acquired, no account information is added to the print job.

11. A non-transitory computer readable storage medium storing a computer-executable program of instructions for causing a computer to perform a control method of a system including a server, a client apparatus, and a printer, the method of the server comprising:

acquiring first account information input on an input screen by a user, acquiring account change restriction information which indicates whether change in account information that is to be added to a print job is prohibited or not, holding the acquired account change restriction information in a first restriction information memory, and determining an operation authority on which a printer driver in the server is operating, wherein, in a case where the operation authority on which the printer driver in the server is operating is an administrator authority, the acquired first account information is held, as administrator account information, in a first administrator account registry memory which is able to be accessed by the administrator authority and which is not able to be accessed by a user authority, the user authority being lower in authority level than the administrator authority, and there being predetermined restriction on operation in the user authority, and wherein, in a case where the operation authority on which the printer driver in the server is operating is the user authority, the acquired first account information is held, as user account information, in a first user account registry memory which is able to be accessed by the user authority, and the method of the client apparatus comprising:

acquiring, from the server, the account change restriction information held in the first restriction information memory, acquiring, from the server, the first account information held in the first administrator account registry memory, acquiring second account information input on an input screen by a user, holding, in a second restriction information memory which is able to be accessed by the administrator authority and which is not able to be accessed by the user authority, the account change restriction information acquired from the server, holding, in a second administrator account registry memory which is able to be accessed by the administrator authority and which is not able to be accessed by the user authority, the first account information acquired from the server as administrator account information, determining whether the account change restriction information held in the second restriction information memory indicates the change in account information is prohibited, and determining an operation authority on which a printer driver in the client apparatus is operating, holding the acquired second account information as user account information, in a second user account registry memory which is able to be accessed by the user authority, in a case where the operation authority on which the printer driver in the client apparatus is operating is the user authority, and where the account change restriction information held in the second restriction information memory indicates the change in account information is prohibited, wherein, in a case where the account change restriction information held in the second restriction information memory indicates the change in account information is prohibited, the first account information held in the second administrator account registry memory is added to the print job, wherein, in a case where the account change restriction information held in the second restriction information memory does not indicate the change in account information is prohibited and where the operation authority on which the printer driver in the client apparatus is operating is the user authority, the second account information held in the second user account registry memory is added to the print job, wherein the print job that the first account information or the second account information is added to is transmitted to the printer via the server.

12. The non-transitory computer readable storage medium according to claim 11, wherein in the case where the account change restriction information held in the second restriction information memory indicates the change in account information is prohibited, the first account information held in the second administrator account registry memory is added to the print job, even if the operation authority on which the printer driver in the client apparatus is operating is the user authority.

13. The non-transitory computer readable storage medium according to claim 11, wherein in the case where the account change restriction information held in the second restriction information memory does not indicate that the change in the account information is prohibited and where the operation authority on which the printer driver in the client apparatus is operating is the administrator authority, the first account information held in the second administrator account registry memory is added to the print job.

14. The non-transitory computer readable storage medium according to claim 11, wherein in the case where the account change restriction information held in the second restriction information memory indicates the change in account information is prohibited and where the first account information held in the second administrator account registry memory is not acquired, no account information is added to the print job.

15. The non-transitory computer readable storage medium according to claim 11, wherein in the case where the account change restriction information held in the second restriction information memory does not indicate the change in account information is prohibited, where the operation authority on which the printer driver in the client apparatus is operating is the user authority, and where the second account information held in the second administrator account registry memory is not acquired, no account information is added to the print job.

* * * * *